(12) United States Patent
Pan

(10) Patent No.: US 7,327,198 B2
(45) Date of Patent: Feb. 5, 2008

(54) METHOD AND SYSTEM FOR A POLYPHASE CLOCK FOR A SECOND INTERMEDIATE FREQUENCY (IF) MIXER TO IMPROVE SIGNAL QUALITY

(75) Inventor: Meng-An Pan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 516 days.

(21) Appl. No.: 10/977,872

(22) Filed: Oct. 29, 2004

(65) Prior Publication Data

US 2006/0094362 A1   May 4, 2006

(51) Int. Cl.
*H03B 21/02* (2006.01)
*H04B 1/26* (2006.01)
*H04B 1/28* (2006.01)

(52) U.S. Cl. ..................... 331/38; 455/313; 455/333

(58) Field of Classification Search ............ 331/37–39, 331/41; 455/313, 317, 323, 333
See application file for complete search history.

(56) References Cited

U.S. PATENT DOCUMENTS

2007/0112904 A1*   5/2007   Kasperkovitz ............... 708/620

* cited by examiner

*Primary Examiner*—David Mis
(74) *Attorney, Agent, or Firm*—McAndrews, Held & Malloy, Ltd.

(57) ABSTRACT

Methods and systems for reducing interference in a signal are disclosed herein. Aspects of the method may comprise generating a first local oscillator signal. The generated first local oscillator signal may be phase-shifted to generate a second local oscillator signal and the second local oscillator signal may be phase-shifted to generate a third local oscillator signal. The first, second, and third local oscillator signals may be combined to generate a combined local oscillator signal, where a third harmonic and/or a fifth harmonic may be eliminated from the combined local oscillator signal. The generated second local oscillator signal may be multiplied by a factor of square root of two ($\sqrt{2}$). The first and third local oscillator signals may be added to the multiplied second local oscillator signal. An input signal may be mixed with the generated combined local oscillator signal to generate a mixed output signal.

18 Claims, 5 Drawing Sheets

METHOD AND SYSTEM FOR A POLYPHASE CLOCK FOR A SECOND INTERMEDIATE FREQUENCY (IF) MIXER TO IMPROVE SIGNAL QUALITY

CROSS-REFERENCE TO RELATED APPLICATIONS/INCORPORATION BY REFERENCE

This application is related to the following applications, each of which is incorporated herein by reference in its entirety for all purposes:
U.S. patent application Ser. No. 10/976,976 filed Oct. 29, 2004;
U.S. patent application Ser. No. 10/976,977 filed Oct. 29, 2004;
U.S. patent application Ser. No. 10/977,000 filed Oct. 29, 2004;
U.S. patent application Ser. No. 10/976,575 filed Oct. 29, 2004;
U.S. patent application Ser. No. 10/977,464 filed Oct. 29, 2004;
U.S. patent application Ser. No. 10/977,798 filed Oct. 29, 2004;
U.S. patent application Ser. No. 10/977,005 filed Oct. 29, 2004;
U.S. patent application Ser. No. 10/977,771 filed Oct. 29, 2004;
U.S. patent application Ser. No. 10/977,868 filed Oct. 29, 2004;
U.S. patent application Ser. No. 10/976,666 filed Oct. 29, 2004;
U.S. patent application Ser. No. 10/977,631 filed Oct. 29, 2004;
U.S. patent application Ser. No. 10/976,639 filed Oct. 29, 2004;
U.S. patent application Ser. No. 10/977,210 filed Oct. 29, 2004;
U.S. patent application Ser. No. 10/977,869 filed Oct. 29, 2004;
U.S. patent application Ser. No. 10/977,874 filed Oct. 29, 2004; and
U.S. patent application Ser. No. 10/976,996 filed Oct. 29, 2004.

FEDERALLY SPONSORED RESEARCH OR DEVELOPMENT

Not applicable.

MICROFICHE/COPYRIGHT REFERENCE

Not applicable.

FIELD OF THE INVENTION

Certain embodiments of the invention relate to the processing of radio signals in a radio frequency (RF) transceiver. More specifically, certain embodiments of the invention relate to a method and system for a polyphase clock for a second intermediate frequency (IF) mixer to improve signal quality.

BACKGROUND OF THE INVENTION

In some conventional signal processing systems, a radio frequency (RF) signal may be converted to an intermediate frequency (IF), and then from IF to a baseband signal, where the IF may be in the megahertz range. Generally, the RF signal may be mixed with a local oscillator (LO) signal that may result in two sideband signals. The two sideband signals may comprise the sum of the frequencies of the two signals and the difference of the frequencies of the two signals. One of the two sideband signals may be selected as an IF signal, where the IF signal may be the same for all received RF signals. A radio that may receive a plurality of channels, such as an AM or FM radio, may tune to a particular station by changing the local oscillator signal frequency such that the IF remains constant. With a constant IF, most of the receive path may be common in the receiver.

With recent advances in technology, much of radio receiver development may be driven mostly by a great demand for mobile wireless communication devices, including handsets. With the ever-decreasing size of mobile handsets, capacities of smaller batteries may be an issue. As most of these handsets may use complementary metal-oxide semiconductor (CMOS) technology for analog to digital conversion, and for much of the processing of voice and data signals, a very important factor to consider may be that it may be advantageous for CMOS devices to work at lower frequencies. This may be crucial since CMOS devices have power dissipation directly related to the speed at which the CMOS devices switch. The faster the frequencies, the faster the CMOS device switching speed, and therefore, the greater the amount of power consumed. The receivers may be designed to downconvert the high frequency RF, which may be in gigahertz range, to a lower frequency, preferably to a baseband frequency, as quickly as possible.

As a result, some receivers may utilize chips for digitally processing baseband signals, and may expect to receive the baseband signal, rather than an IF signal. To meet this need, some receiver architectures, for example, direct-conversion receivers, may be adapted not to utilize IF by converting directly from RF to baseband, and therefore reduce implementation costs as well as power consumption by not processing IF signals. However, with direct conversion, the reduced power consumption may be offset by strong drawbacks, such as DC-offset generation, interference noise, I/Q mismatch, excessive flicker noise in the baseband, and local oscillator (LO) leakage. In addition, a digital signal processor (DSP) may be required to perform complex digital processing of the digital signal for filtering and downconverting from the RF frequency.

If a measured signal-to-noise ratio (SNR) is less than a desired SNR, the DSP may need to perform, for example, distortion cancellation or other SNR reduction or mitigation function. Additionally, during direct conversion a majority of gain and filtering may be performed in a frequency band from DC to the signal bandwidth. In this process, a signal path's intrinsic DC offsets may be amplified. The dynamic range of the circuit may thereby be degraded. In addition, a DC offset may be created if the LO signal leaks to the RF front end and self-mixes. Some systems, for example, GSM systems, may utilize modulation and system synchronization techniques that require DC information. As a result, it may not be feasible to simply remove the DC component and complex and costly DSP processing may be required to reduce the DC offset while still keeping the information present in the DC signal. Further, conventional direct conversion receivers, as well as conventional receivers that utilize conversion to IF, may utilize one or more downconversion mixers to mix one or more input signals with an oscillator signal of a determined frequency. Both the input signal and the oscillator signals, however, may also introduce a plurality of harmonics into the mixing circuitry thus increasing the overall noise profile in a generated output signal.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for reducing interference in a signal. Aspects of the method may comprise generating a first local oscillator signal. The generated first local oscillator signal may be phase-shifted to generate a second local oscillator signal and the second local oscillator signal may be phase-shifted to generate a third local oscillator signal. The first, second, and third local oscillator signals may be combined to generate a combined local oscillator signal, where at least a third harmonic and a fifth harmonic may be eliminated from the combined local oscillator signal. The generated second local oscillator signal may be multiplied by a factor of square root of two ($\sqrt{2}$). The first and third local oscillator signals may be added to the multiplied second local oscillator signal.

An input signal may be mixed with the generated combined local oscillator signal to generate a mixed output signal. At least a third harmonic and/or a fifth harmonic may be eliminated from the mixed output signal. The input signal may comprise an I-channel intermediate frequency (IF) signal and/or a Q-channel intermediate frequency signal. The input signal may be defined by $\cos(2\pi f_{in}t)$ and/or $\sin(2\pi f_{in}t)$, where $f_{in}$ may be a base frequency of the input signal. The second local oscillator signal may be 45° out of phase with the first local oscillator signal and the third local oscillator signal may be 45° out of phase with the second local oscillator signal. A DC component contributed by an interference/blocker at third, fifth, and/or seventh harmonic of the input signal in the mixed output signal may be removed.

Aspects of the system may comprise a local oscillator that generates a first local oscillator signal. A phase shifter may phase-shift the generated first local oscillator signal to generate a second local oscillator signal. The phase shifter may also phase-shift the generated second local oscillator signal to generate a third local oscillator signal. A combiner may be adapted to combine the generated first, second, and third local oscillator signals, to generate a combined local oscillator signal. A third harmonic and/or a fifth harmonic may be eliminated from the combined local oscillator signal. A multiplier may be adapted to multiply the generated second local oscillator signal by a factor of square root of two ($\sqrt{2}$). An adder may add the first and third local oscillator signal to the multiplied the generated second local oscillator signal.

A mixer may mix an input signal with the generated combined local oscillator signal, to generate a mixed output signal. A third harmonic and/or a fifth harmonic may be eliminated from the mixed output signal. The input signal may comprise an I-channel intermediate frequency signal and/or a Q-channel intermediate frequency. The input signal may be defined by $\cos(2\pi f_{in}t)$ and/or $\sin(2\pi f_{in}t)$, where $f_{in}$ is a base frequency of the input signal. The second local oscillator signal may be 45° out of phase with the first local oscillator signal and the third local oscillator signal may be 45° out of phase with the second local oscillator signal. The mixer may remove a DC component contributed by an interference/blocker at third, fifth, and/or seventh harmonic of the input signal in the mixed output signal.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for reducing interference in a signal. During one or more downconversion stages within a radio frequency (RF) receiver, a plurality of downconversion mixers may be utilized to downconvert a received signal. The received signal may be mixed with a local oscillator signal, for example, to achieve frequency downconversion. The received signal after downconversion to 100 kHz may be characterized at interference/blockers at third and subsequent harmonics. The local oscillator signal may be characterized by a plurality of harmonics. After mixing of the received signal with the local oscillator signal, the interference/blockers may be folded onto the desired signal. In accordance with an aspect of the invention, a combined local oscillator signal, rather than a single local oscillator signal, may be utilized within one or more downconversion mixers, where one or more harmonics may be eliminated from the combined local oscillator signal. For example, three local oscillator signals may be utilized, each oscillator signal shifted by 45° from the previous oscillator signal and the second oscillator signal may be multiplied by a square root of two ($\sqrt{2}$). The three local oscillator signals may be added to generate a combined local oscillator signal in which there are no third and fifth harmonics. Consequently, after mixing an output signal with the combined local oscillator signal, there may be no DC component contributed by an interference/blocker at third, fifth, and/or seventh harmonic of the input signal in the mixed output signal.

Figure 1:
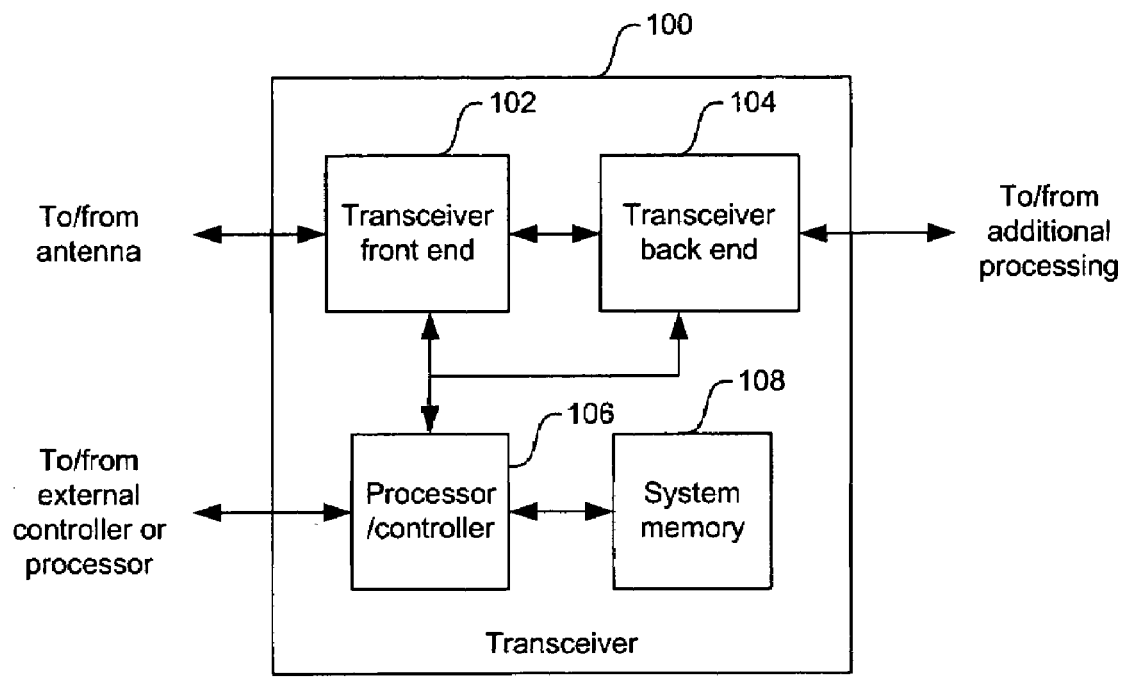
FIG. 1 is a block diagram of an exemplary radio frequency (RF) transceiver system, in accordance with an embodiment of the invention.

FIG. 1 is a block diagram of an exemplary radio frequency (RF) transceiver system, in accordance with an embodiment of the invention. Referring to FIG. 1, the RF transceiver system 100 may comprise a transceiver front end 102, a transceiver back end 104, a controller/processor 106, and a system memory 108. The transceiver front end 102 may comprise suitable logic, circuitry, and/or code that may be adapted to receive and/or transmit an RF signal. The transceiver front end 102 may comprise a receiver portion and a transmitter portion. Both the transmitter portion and the receiver portion may be coupled to an external antenna for signal broadcasting and signal reception respectively. The transceiver front end 102 may modulate a signal for transmission and may also demodulate a received signal before further processing of the received signal is to occur. Moreover, the transceiver front end 102 may provide other functions, for example, digital-to-analog conversion (DAC), analog-to-digital conversion (ADC), frequency downsampling, frequency upsampling, and/or filtering. The transceiver front end 102 may provide a local oscillator frequency, which may be utilized for modulation and/or demodulation operations.

The transceiver back end 104 may comprise suitable logic, circuitry, and/or code that may be adapted to digitally process received signals from the transceiver front end 102 and/or to process signals received from at least one processing block, which may be located externally to the RF transceiver system 100. The transceiver back end 104 may comprise a baseband processor, for example. Accordingly, signals transferred from the transceiver front end 102 to the transceiver back end 104 may have been downconverted to a baseband frequency. The transceiver back end 104 may also comprise a signal interface that may allow the transceiver front end 102 to transfer signals that have been downconverted to a low IF. In this case, a baseband processor in the transceiver back end 104 may process information after downconversion to the baseband frequency by the signal interface.

The controller/processor 106 may comprise suitable logic, circuitry, and/or code that may be adapted to control the operations of the transceiver front end 102 and/or the transceiver back end 104. For example, the controller/processor 106 may be utilized to update and/or modify programmable parameters and/or values in a plurality of components, devices, and/or processing elements in the transceiver front end 102 and/or in the transceiver back end 104. Control and/or data information may be transferred from at least one controller and/or processor external to the RF transceiver system 100 to the controller/processor 106 during the operation of the RF transceiver system 100. Moreover, the controller/processor 106 may also be adapted to transfer control and/or data information to at least one controller and/or processor external to the RF transceiver system 100.

The controller/processor 106 may be adapted to utilize the received control and/or data information to determine the mode of operation of the transceiver front end 102. For example, the controller/processor 106 may be adapted to select between a mode of operation where a received signal in the transceiver front end 102 may be downconverted to a baseband frequency, or a mode of operation, where a received signal may be downconverted to a low IF. The system memory 108 may comprise suitable logic, circuitry, and/or code that may be adapted to store a plurality of control and/or data information. In an exemplary aspect of the invention, one or more mixers may be utilized in the transceiver 102 to downconvert a received signal to IF. After the received signal is downconverted to IF, it may be further downconverted to DC. Reduction in interference/blockers in the downconverted signal may be achieved by utilizing a combined local oscillator signal with eliminated third and fifth harmonic, for example. Phase-shifted local oscillator signals may be added to generate the combined local oscillator signal, where one or more of the phase-shifted local oscillator signals may be multiplied by a determined factor, such as a factor of square root of two ($\sqrt{2}$), for example.

Figure 2A:
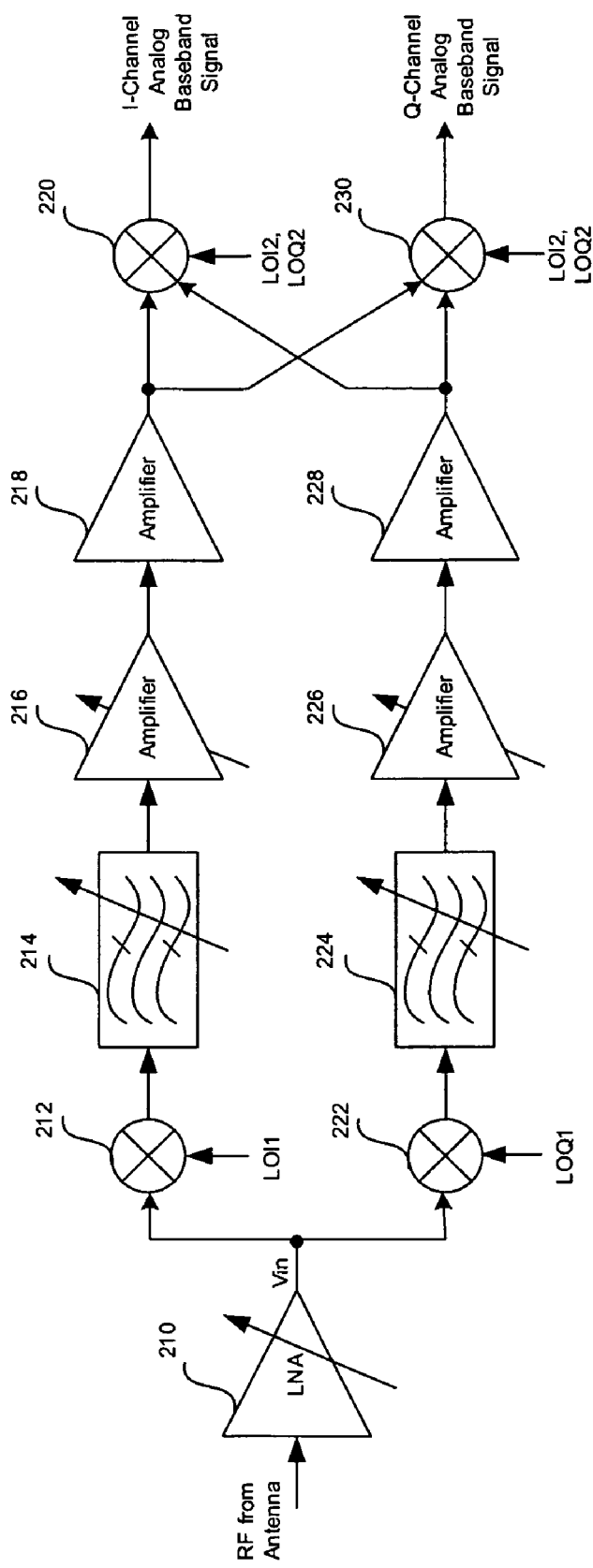
FIG. 2A is a block diagram illustrating an exemplary RF receiver front end using a single sideband receiver architecture to extract an analog baseband signal, in accordance with an embodiment of the invention.

FIG. 2A is a block diagram illustrating an exemplary RF receiver front end using a single sideband receiver architecture to extract an analog baseband signal, in accordance with an embodiment of the invention. Referring to FIG. 2A, there is shown a low noise amplifier (LNA) 210, mixers 212, 222, 220 and 230, bandpass filters 214 and 224, programmable gain amplifiers (PGA) 216 and 226, and amplifiers 218 and 228. The LNA 210 may comprise suitable logic, circuitry, and/or code that may be adapted to amplify input signals and output the amplified signals. The LNA 210 may be utilized in instances where the signal to noise ratio (SNR) may be relatively low, such as, for example, RF signals received by an antenna.

The mixers 212 and 222 may comprise suitable logic, circuitry, and/or code that may be adapted to have as inputs two signals, and generate an output signal, which may be a difference of the frequencies of the two input signals and/or a sum of the frequencies of the two input signals. The bandpass filters 214 and 224 may comprise suitable logic, circuitry, and/or code that may be adapted to selectively pass signals within a certain bandwidth while attenuating signals outside that bandwidth. The bandpass filters 214 and 224 may further comprise an amplifier circuit that may amplify the bandpass filtered signal, and the gain of the amplifier circuit may be controlled by a processor, such as, for example, a baseband processor 154 or a processor/controller 156.

The PGAs 216 and 226 may comprise suitable logic, circuitry, and/or code that may be adapted to amplify input signals and output the amplified signals. The gain of the amplifiers 216 and 226 may be controlled by a processor, such as, for example, a baseband processor 154 (FIG. 1*b*) or a processor/controller 156 (FIG. 1*b*). The gain of the PGAs 216 and 226 may be as high as, for example, 30 dB. The amplifiers 218 and 228 may comprise suitable logic, circuitry, and/or code that may be adapted to amplify input signals and output the amplified signals. The gain of the amplifiers 216 and 226 may be amplify input signals and output the amplified signals. The amplifiers 218 and 228 may be fixed gain amplifiers, and the gain may be fixed, for example, at 15 dB.

The mixers 220 and 230 may comprise suitable logic, circuitry, and/or code that may be adapted to mix two input signals with two local oscillator input signals to produce an output signal that may be a difference of the frequencies of the two input signals and/or a sum of the frequencies of the two input signals. Additionally, the mixers 220 and 230 may reduce interferers/blockers around a desired bandwidth of the output signal by utilizing phase shifted input signals and phase shifted local oscillator signals. Interferers/blockers may be undesired signals that may interfere with and/or block a desired signal.

In operation, the RF signal, which may have a carrier frequency $f_{RF}$, may be received by an antenna and communicated to the LNA 210, where the RF signal may be amplified by the LNA 210. The amplified RF signal may be communicated to an input of the mixers 212 and 222. The mixers 212 and 222 may mix this amplified signal with local oscillator signals LOI1 and LOQ1, respectively. The outputs of the mixers 212 and 222 may be IF I and Q signals, respectively, and these signals may be at an intermediate frequency (IF).

The IF I and Q signals may be communicated to a bandpass filters 214 and 224, which may be adapted to pass the desired bandwidth of signals about the IF frequency, while attenuating the undesired frequencies in the IF signal, and may also amplify the desired bandwidth of signals. The filtered and amplified IF I and Q signals may be communicated to PGAs 216 and 226, and these signals may be amplified. The gain of the amplifier may be controlled by a processor, for example, a baseband processor 154 or a processor/controller 156. The amplified output signals IF I and IF Q of the bandpass filters 214 and 224 may be communicated to the amplifiers 218 and 228. The IF I and Q signals may be further amplified. The IF I signal generated at the output of the amplifier 218 may be communicated to an input of the mixers 220 and 230, and the IF Q signal at the output of the amplifier 228 may be communicated to another input of the mixers 220 and 230.

The mixers 220 and 230 may also be adapted to receive as inputs two local oscillator signals LOI2 and LOQ2. The four inputs at each mixer 220 and 230 may be mixed and combined by the mixers 220 and 230, respectively, to result in baseband I and Q signals, respectively, and these baseband signals may have less interference/blocker at the desired bandwidth than if generated from a mixer similar to, for example, mixer 212 or 222.

Figure 2B:
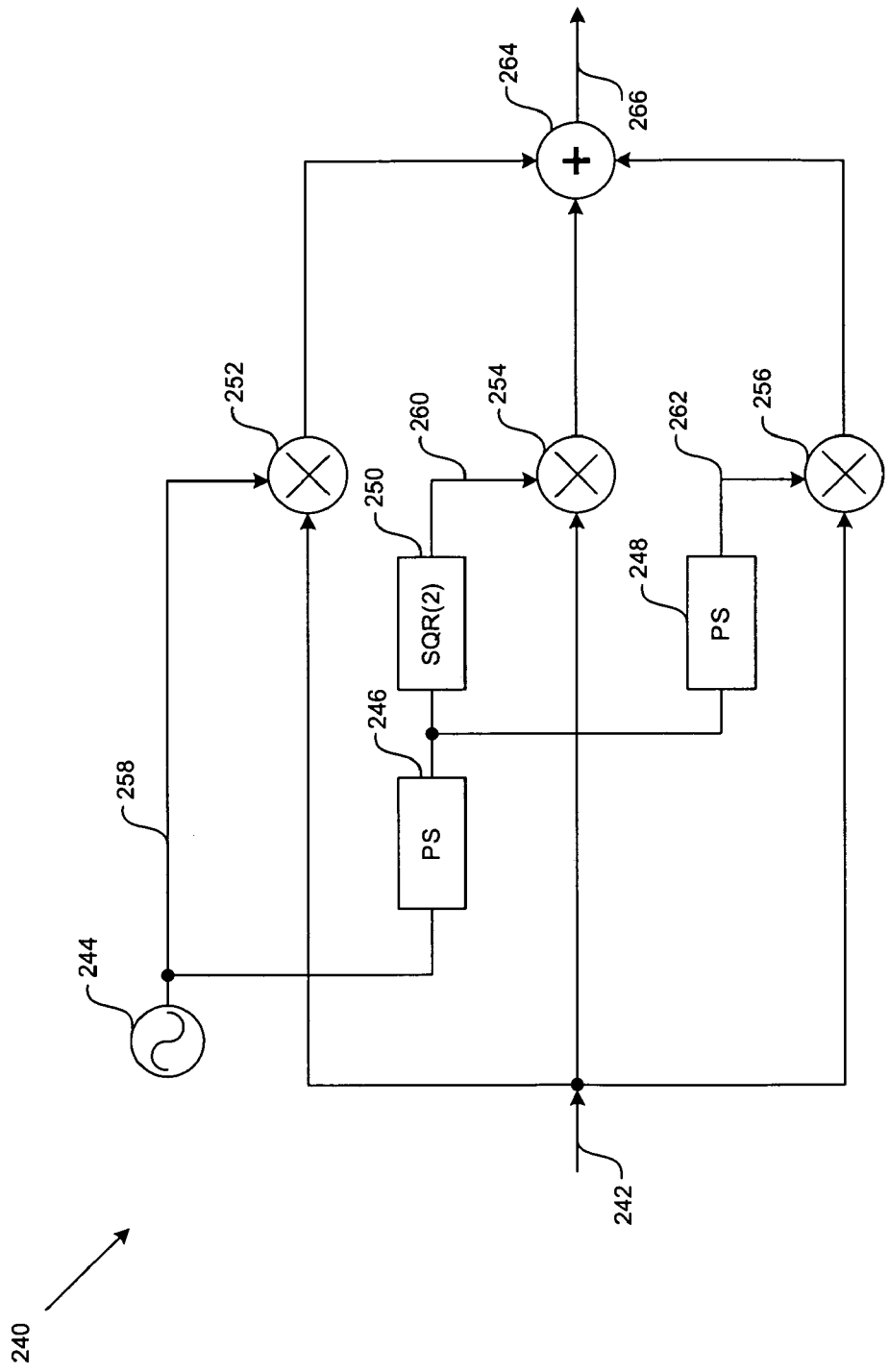
FIG. 2B is a block diagram of an exemplary mixer circuit utilizing phase-shifted local oscillator signals, in accordance with an embodiment of the invention.

FIG. 2B is a block diagram of an exemplary mixer circuit 240 utilizing phase-shifted local oscillator signals, in accordance with an embodiment of the invention. Referring to FIG. 2B, the mixer circuit 240 may comprise a LO generator 244, phase shifters 246 and 248, a multiplier 250, mixers 252, 254, and 256, and a combiner 264. The LO generator 244 may be adapted to generate a local oscillator signal 258 at a determined frequency, such as 100 kHz. The LO generator 244 may comprise a differential output generator so that the LO signal 258 may comprise an in-phase ("I") and a quadrature ("Q") signal components.

The phase shifters 246 and 248 may comprise suitable circuitry and/or logic and may be adapted to phase-shift an input signal to achieve a determined phase difference. The multiplier 250 may comprise suitable circuitry and/or logic and may be adapted to multiply an input signal by a factor of square root of two ($\sqrt{2}$), for example. The mixers 252, 254, and 256 may comprise suitable circuitry and/or logic and may be adapted to acquire a LO signal and an input signal and generate an output downconverted signal.

In operation, the LO generator 244 may generate a LO signal LO1 258. The generated LO signal LO1 258 may then be communicated to mixer 252 for mixing with the input signal 242. The LO signal LO1 may also be communicated to the phase shifter 246 for phase-shifting. The phase shifter 246 may phase-shift the LO signal LO1 to generate a first phase-shifted signal. In one aspect of the invention, the phase shifter 246 may phase-shift signal LO1 by 45°, for example. After signal LO1 is phase-shifted, the generated phase-shifted signal LO2 may be multiplied by a factor of the square root of two ($\sqrt{2}$), for example. The resulting multiplied signal 260 may be communicated to the mixer 254 for mixing with the input signal 242.

After the signal LO1 258 is phase-shifted by phase shifter 246 and signal LO2 is generated, the signal LO2 may be phase-shifted by phase shifter 248 to generate LO signal LO3 262. In one aspect of the invention, the phase shifter 248 may phase-shift signal LO2 by 45°, for example. The generated LO signal LO3 262 may then be communicated to the mixer 256 for mixing with the input signal 242. The downconverted signal component outputs from the mixers 252, 254, and 256 may be combined by the combiner 264 to generate a downconverted signal 266.

In one aspect of the invention, the mixer circuit 240 may be adapted to downconvert a single input signal utilizing three phase-shifted local oscillator signals LO1, LO2, and LO3, as illustrated in FIG. 2A. The resultant local oscillator signal LO' may be represented by the equation LO'=LO1+($\sqrt{2}$)*LO2+LO3. Since LO1, LO2, and LO3 are phase-shifted from each other by 45° and comprise infinite number of harmonics, LO1, LO2, and LO3 may be represented by the following equations:

$LO1=(1/\pi)*[(\cos wt-\sin wt)+(\frac{1}{3})(\cos 3wt+\sin 3wt)+(\frac{1}{5})(\cos 5wt-\sin 5wt)\ldots];$ $LO2=(\sqrt{2}/\pi)*[(\cos wt)-(\frac{1}{3})(\cos 3wt)+(\frac{1}{5})(\cos 5wt)\ldots];$ and $LO3=(1/\pi)*[(\cos wt+\sin wt)+(\frac{1}{3})(\cos 3wt-\sin 3wt)+(\frac{1}{5})(\cos 5wt+\sin 5wt)\ldots]$ Accordingly, after substituting the above equations in the equation LO'=LO1+($\sqrt{2}$)*LO2+LO3, it may be determined that the third and fifth harmonic in the combined local oscillator signal LO' may be eliminated as LO' only contains harmonics at fundamental oscillator frequency Flo, 7*Flo, 9*Flo, etc. In this manner, DC components in the output signal 266 corresponding to one or more harmonics in the input signal 242, may be reduced by utilizing a combined LO signal, such as the LO signal LO', in place of a single LO signal generated by the LO generator 204.

Figure 3:
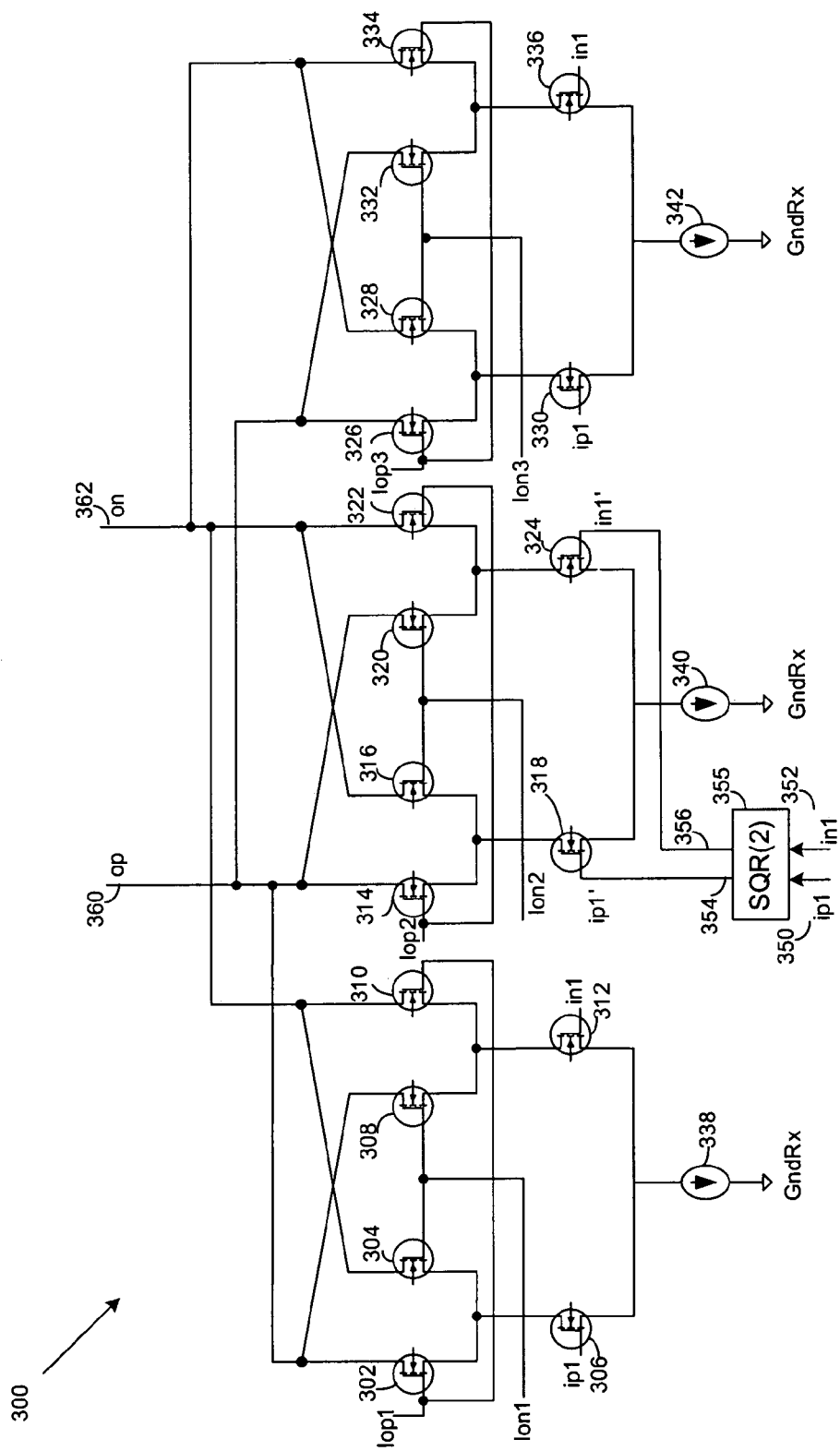
FIG. 3 is a circuit diagram of an exemplary mixer circuit implementation utilizing phase-shifted local oscillator signals, in accordance with an embodiment of the invention.

FIG. 3 is a circuit diagram of an exemplary mixer circuit implementation utilizing phase-shifted local oscillator signals, in accordance with an embodiment of the invention. Referring to FIG. 3, the mixer circuit 300 may comprise three Gilbert cells, as illustrated on FIG. 1D, and may be adapted to utilize a plurality of phase-shifted local oscillator signals resulting in reduced noise characteristics in the output signal.

The first Gilbert cell within the mixer 300 may comprise transistors 302, 304, 306, 308, 310, and 312, and current source 338. The second Gilbert cell within the mixer 300 may comprise transistors 314, 316, 318, 320, 322, and 324, current source 340, and multiplier 355. The third Gilbert cell within the mixer 300 may comprise transistors 326, 328, 330, 332, 334, and 336, and current source 342. At least one of the transistors within the mixer 300 may comprise NMOS transistors, for example.

Within the three Gilbert cells of mixer 300, transistors 302, 304, 308, 310, 314, 316, 320, 322, 326, 328, 332, and 334 may be utilized to perform frequency mixing operation in the mixer 300. Within the first Gilbert cell, a first positive LO signal component Iop1 and a first negative LO signal component Ion1 may be communicated to the gates of transistors [302; 310] and [304; 308], respectively. A positive input signal component ip1 and a negative input signal component in1 from a differential input signal may be applied to the gates of transistors 306 and 312, respectively. Transistors 306 and 312 may be utilized to provide a differential input gain for the input signal components based on the value of the current source 338.

Within the second Gilbert cell, a second positive LO signal component Iop2 and a second negative LO signal component Ion2 may be applied to the gates of transistors [314; 322] and [316; 320], respectively. A positive input signal component ip1 350 and a negative input signal component in1 352 from a differential input signal may be applied to the multiplier block 355. The multiplier block 355 may multiply the positive and negative components 350 and 352 of the input signal by a factor of $\sqrt{2}$ and generate a multiplied positive signal component ip1' 354 and a multiplied negative signal component in1' 356. The multiplied positive signal component ip1' 354 and the multiplied negative signal component in1' 356 may be communicated to the gates of transistors 318 and 324, respectively. Transistors 318 and 324 may be utilized to provide a differential input gain for the input signal components based on the value of the current source 340.

Within the third Gilbert cell, a third positive LO signal component Iop3 and a third negative LO signal component Ion3 may be applied to the gates of transistors [326; 334] and [328; 332], respectively. A positive input signal component ip1 and a negative input signal component in1 from a differential input signal may be applied to the gates of transistors 330 and 336, respectively. Transistors 330 and 336 may be utilized to provide a differential input gain for the input signal components based on the value of the current source 342.

In operation, a positive signal component ip1 and a negative signal component in1 of a differential input signal may be communicated simultaneously to the three Gilbert cells within the mixer 300. In addition, three local oscillator signals with positive components Iop1, Iop2, and Iop3, and negative components Ion1, Ion2, and Ion3 may be communicated to the first, second, and third Gilber cell, respectively. In one aspect of the invention, the three local oscillator signals may be successively phase-shifted by 45°, for example, as described in more detail in FIG. 2.

Further, instead of multiplying the second oscillator signal by a determined factor so as to achieve harmonic cancellation within the resulting combined oscillator signal, as described with regard to FIG. 2, the positive and negative components ip1 350 and in1 352 of the input signal may be multiplied to achieve the same effect. In this manner, the multiplier 355 may multiply the input signal components 350 and 352 by a determined factor, such as a square root of two ($\sqrt{2}$), for example, to generate the multiplied signals 354 and 356. After the corresponding positive and negative components of the three phase-shifted local oscillator signals are mixed with the corresponding signal inputs within the three Gilbert cells, a positive output component op 360 and a negative output component on 362 may be generated as an output. Since three phase-shifted local oscillator signals are utilized within the mixer block 300 together with a multiplied signal input to the second Gilbert cell, third and fifth harmonic cancellation may be achieved within the combined local oscillator signal, resulting in a reduced interference/blocker in the output signal.

Figure 4:
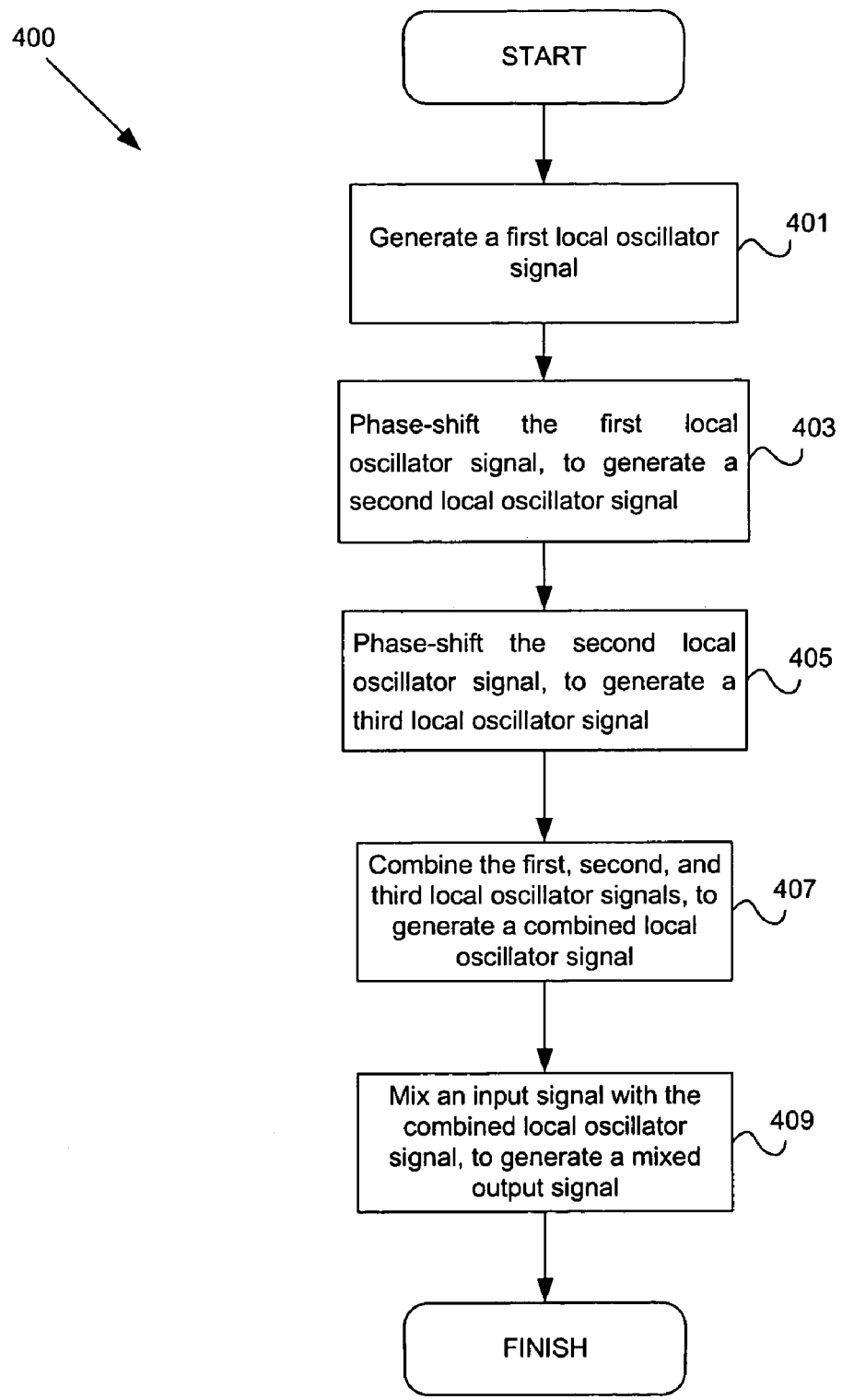
FIG. 4 is a flow diagram of an exemplary method for reducing interference in a signal, in accordance with an embodiment of the invention.

FIG. 4 is a flow diagram of an exemplary method 400 for reducing interference in a signal, in accordance with an embodiment of the invention. Referring to FIG. 4, at 401, a first local oscillator signal may be generated. At 403, the first local oscillator signal may be phase-shifted to generate a second local oscillator signal. For example, the first local oscillator signal may be phase-shifted by 45° to generate the second local oscillator signal. At 405, the second local oscillator signal may be phase-shifted to generate a third local oscillator signal. For example, the second local oscillator signal may be phase-shifted by 45° to generate the third local oscillator signal. At 407, the generated first, second, and third local oscillator signals may be combined by an adder, for example. In one aspect of the invention, prior to combining the three local oscillator signals, the second local oscillator signal may be multiplied by the square root of two ($\sqrt{2}$). At 409, an input signal may be mixed with the combined local oscillator signal to generate a mixed output signal.

Although combined local oscillator signals may be generated from three phase-shifted local oscillator signals, the invention may not be so limited. A combined local oscillator signal may be generated utilizing more than three phase-shifted local oscillator signals, each shifted by 45°, for example. In this manner, in addition to eliminating the third and fifth harmonic in the combined local oscillator signal, other harmonics may also be eliminated. Consequently, after a combined local oscillator signal is mixed with an input signal, replication of harmonics at DC may be avoided for a plurality of harmonics in the input signal.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for reducing interference in a signal, the method comprising:
   generating a first local oscillator signal;
   phase-shifting said generated first local oscillator signal, to generate a second local oscillator signal;
   phase-shifting said generated second local oscillator signal, to generate a third local oscillator signal;
   combining said generated first, second, and third local oscillator signals, to generate a combined local oscillator signal, wherein at least a third harmonic and a fifth harmonic are eliminated from said combined local oscillator signal; and
   mixing an input signal with said generated combined local oscillator signal to generate a mixed output signal, wherein at least a third harmonic and a fifth harmonic are eliminated from said mixed output signal.

2. The method according to claim 1, comprising multiplying said generated second local oscillator signal by a factor of square root of two ($\sqrt{2}$).

3. The method according to claim 2, comprising adding said first and third local oscillator signal to said multiplied generated second local oscillator signal.

4. The method according to claim 1, wherein said input signal comprises at least one of an I-channel intermediate frequency signal and a Q-channel intermediate frequency.

5. The method according to claim 1, wherein said input signal is defined by $\cos(2\pi f_{in}t)$, wherein $f_{in}$ is a base frequency of said input signal.

6. The method according to claim 1, wherein said input signal is defined by $\sin(2\pi f_{in}t)$, wherein $f_{in}$ is a base frequency of said input signal.

7. The method according to claim 1, wherein said second local oscillator signal is 45° out of phase with said first local oscillator signal.

8. The method according to claim 1, wherein said third local oscillator signal is 45° out of phase with said second local oscillator signal.

9. The method according to claim 1, comprising removing a DC component contributed by at least one of a third, a fifth, and a seventh harmonic of said input signal in said mixed output signal.

10. A system for reducing interference in a signal, the system comprising:
   a local oscillator that generates a first local oscillator signal;
   a phase shifter that phase-shifts said generated first local oscillator signal, to generate a second local oscillator signal;
   said phase shifter phase-shifts said generated second local oscillator signal, to generate a third local oscillator signal; and
   a combiner that combines said generated first, second, and third local oscillator signals, to generate a combined local oscillator signal, wherein at least a third harmonic and a fifth harmonic are eliminated from said combined local oscillator; and
   a mixer that mixes an input signal with said generated combined local oscillator signal to generate a mixed output signal, wherein at least a third harmonic and a fifth harmonic are eliminated from said mixed output signal.

11. The system according to claim 10, comprising a multiplier that multiplies said generated second local oscillator signal by a factor of square root of two ($\sqrt{2}$).

12. The system according to claim 11, comprising an adder that adds said first and third local oscillator signal to said multiplied generated second local oscillator signal.

13. The system according to claim 10, wherein said input signal comprises at least one of an I-channel intermediate frequency signal and a Q-channel intermediate frequency.

14. The system according to claim 10, wherein said input signal is defined by $\cos(2\pi f_{in}t)$, wherein $f_{in}$ is a base frequency of said input signal.

15. The system according to claim 10, wherein said input signal is defined by $\sin(2_{in}t)$, wherein $f_{in}$ is a base frequency of said input signal.

16. The system according to claim 10, wherein said second local oscillator signal is 45° out of phase with said first local oscillator signal.

17. The system according to claim 10, wherein said third local oscillator signal is 45° out of phase with said second local oscillator signal.

18. The system according to claim 10, wherein said mixer removes a DC component contributed by at least one of a third, a fifth, and a seventh harmonic of said input signal in said mixed output signal.

* * * * *